United States Patent
Rinaldi et al.

(10) Patent No.: US 9,758,731 B2
(45) Date of Patent: Sep. 12, 2017

(54) PROCESS FOR CONVERTING PHENOLIC COMPOUNDS INTO AROMATIC HYDROCARBONS

(71) Applicant: STUDIENGESELLSCHAFT KOHLE MBH, Mülheim an der Ruhr (DE)

(72) Inventors: Roberto Rinaldi, Mülheim an der Ruhr (DE); Xingyu Wang, Mülheim an der Ruhr (DE)

(73) Assignee: STUDIENGESELLSCHAFT KOHLE MBH, Muelheim an der Ruhr (DE)

( * ) Notice: Subject to any disclaimer, the term of this patent is extended or adjusted under 35 U.S.C. 154(b) by 0 days.

(21) Appl. No.: 14/651,033

(22) PCT Filed: Dec. 10, 2013

(86) PCT No.: PCT/EP2013/076123
§ 371 (c)(1),
(2) Date: Jun. 10, 2015

(87) PCT Pub. No.: WO2014/090822
PCT Pub. Date: Jun. 19, 2014

(65) Prior Publication Data
US 2015/0315483 A1    Nov. 5, 2015

(30) Foreign Application Priority Data
Dec. 11, 2012 (EP) .................... 12196519

(51) Int. Cl.
*C07C 1/20*   (2006.01)
*C10G 3/00*   (2006.01)
*C10G 45/02*  (2006.01)
*C10G 45/28*  (2006.01)
(Continued)

(52) U.S. Cl.
CPC ............... *C10G 3/52* (2013.01); *C10G 3/45* (2013.01); *C10G 3/47* (2013.01); *C10G 3/50* (2013.01); *C10G 45/02* (2013.01); *C10G 45/28* (2013.01); *C10G 45/30* (2013.01); *C10G 49/20* (2013.01); *C10G 2300/42* (2013.01); *C10G 2400/30* (2013.01); *Y02P 30/20* (2015.11)

(58) Field of Classification Search
CPC ................ C07C 1/20; C07C 1/24; C10G 1/00
USPC ........................ 585/469, 240, 242
See application file for complete search history.

(56) References Cited

U.S. PATENT DOCUMENTS

| | | | |
|---|---|---|---|
| 3,415,896 A * | 12/1968 | Hay | ............... C07C 2/865 564/307 |
| 4,303,497 A | 12/1981 | Mitchell et al. | |
| 4,329,221 A | 5/1982 | Farcasiu et al. | |

(Continued)

OTHER PUBLICATIONS

Mortensen et al.; "A review of catalytic upgrading of bio-oil to engine fuels"; Applied Catalysis A: General 407 (2011) 1-19.

(Continued)

*Primary Examiner* — Thuan D Dang
(74) *Attorney, Agent, or Firm* — Norris McLaughlin & Marcus, P.A.

(57) ABSTRACT

The present invention discloses a process for the conversion of phenolics into aromatic hydrocarbons. In more detail, the present invention refers to a process for the selective hydrodeoxygenation of phenolic feeds into aromatic hydrocarbons, such as benzene, toluene, alkylbenzenes and others. The selective catalytic hydrodeoxygenation is performed in absence of external supply of molecular hydrogen.

17 Claims, 1 Drawing Sheet

(51) Int. Cl.
*C10G 45/30* (2006.01)
*C10G 49/20* (2006.01)

(56) References Cited

U.S. PATENT DOCUMENTS

| | | | | |
|---|---|---|---|---|
| 4,626,605 | A | * 12/1986 | Wojtech | C07C 37/72 |
| | | | | 568/749 |
| 2004/0094484 | A1 | * 5/2004 | Zhuang | C02F 1/52 |
| | | | | 210/721 |
| 2010/0300984 | A1 | * 12/2010 | Kastner | B01D 53/8662 |
| | | | | 210/763 |
| 2010/0314286 | A1 | 12/2010 | Castillo et al. | |

OTHER PUBLICATIONS

International Search Report issued in corresponding application PCT/EP2013/076123 mailed Apr. 3, 2014.

Written Opinion of the International Preliminary Examining Authority mailed Nov. 24, 2014 and Comments filed concerning the Written Opinion.

\* cited by examiner

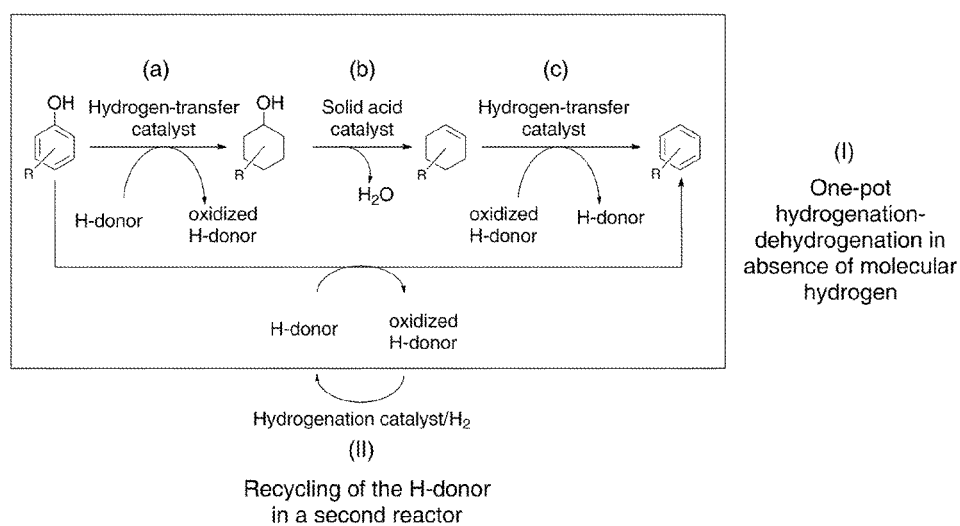

PROCESS FOR CONVERTING PHENOLIC COMPOUNDS INTO AROMATIC HYDROCARBONS

This application is a 371 of International Patent Application No. PCT/EP2013/076123, filed Dec. 10, 2013, which claims foreign priority benefit under 35 U.S.C. §119 of the European Patent Application No. 12196519.8, filed Dec. 11, 2012, the disclosures of which patent applications are incorporated herein by reference.

The present invention discloses a process for the conversion of phenolics into aromatic hydrocarbons. In more detail, the present invention refers to a process for the selective hydrodeoxygenation of phenolic feeds into aromatic hydrocarbons, such as benzene, toluene, alkylbenzenes and others. The selective catalytic hydrodeoxygenation is performed in absence of external supply of molecular hydrogen.

Forests and crops capture around 1% of the incoming solar radiation into biomass. This energy is stored in complex molecules, such as carbohydrates, lignins, proteins, glycerides, terpenes, and others. Unfortunately, tapping this resource directly to obtain fuels and chemicals is not possible, but instead new catalytic processes are required to facilitate and control the required conversions. Over the 20th century, the petrochemical and the chemical industry developed numerous processes to transform hydrocarbon-like compounds into almost everything that surrounds us in our modern world. However, most of these processes are not suitable for converting biomass. In biorefineries, processing thus starts from highly oxygenated raw materials, and controlled de-functionalization is necessary, instead of functionalization used nowadays in the chemical industry. An efficient transformation of biomass should thus reduce its oxygen content—through efficient catalytic processes—providing alternative pathways for the production of fuels and chemicals.

Efficient catalytic processes are required for exploiting alternative sources of carbon (e.g., lignocellulosic residues) to the fullest, diminishing modern society's reliance on crude oil. Converting plant biomass into bio-oil is part of a portfolio of solutions currently in development for the production of engine fuels. In the fast pyrolysis of wood to bio-oil, an increase in energy density by a factor of 7 to 8 is achieved (P. M. Mortensen, J. D. Grunwaldt, P. A. Jensen, K. G. Knudsen and A. D. Jensen, Appl. Catal. A-Gen., 2011, 407, 1-19).

In spite of this, having an oxygen-content as high as 40 wt %, bio-oil still has a much lower energy density than crude oil. Furthermore, the high-oxygen content makes bio-oil unstable on storage. Consequently, its viscosity increases and polymeric particles are also formed. To circumvent these problems, the upgrade of bio-oil is needed, in order to decrease its oxygen-content and its reactivity.

Two general routes for upgrading bio-oil were discussed in great detail (P. M. Mortensen, J. D. Grunwaldt, P. A. Jensen, K. G. Knudsen and A. D. Jensen, Appl. Catal. A-Gen., 2011, 407, 1-19). Hydrodeoxygenation (HDO) and "zeolite cracking" were outlined as the most promising avenues to convert bio-oils into engine fuels.

In HDO processes, bio-oil is subjected to high pressures of $H_2$ (80 to 300 bar) and to high temperatures (300 to 400° C.) for reaction times up to 4 h. In the best cases, these processes lead to an 84% yield of oil. The HDO processes are performed with sulfide-based catalysts or noble metal supported catalysts.

In the cracking of bio-oil using zeolites, the upgrade is conducted under lower pressures for less than 1 h, but temperatures up to 500° C. are necessary for obtaining yields of oil as high as 24%. In both processes, the severity of the process conditions poses a major problem for the energy-efficient upgrading of bio-oil. In addition, it is not possible to produce aromatic hydrocarbons (aromatics), as drastic reaction conditions cause the full hydrogenation producing saturated hydrocarbons.

Accordingly, there is the need for an improved process for producing aromatics from lignin and bio-oil feeds.

The inventors of the present invention found that phenolic feeds can be converted into aromatic hydrocarbons (e.g., benzene, toluene, naphthalene and others) by using a selective hydrodeoxygenation process, which comprises subjecting the phenolic feeds to a one-pot hydrotreatment, performed in absence of external supply of molecular hydrogen, where the hydrotreatment comprises contacting the phenolic feeds as phenolic compounds, a metal skeletal catalyst (e.g., Nickel) and a solid acid catalyst (e.g., zeolites) in the presence of a secondary alcohol and/or a cyclic alkene, as hydrogen donor (H-donor), under autogenous pressure of 5 to 100 bar and at a temperature of 50 to 300° C. The formed oxidized H-donor is stripped from the product mixture, e.g., by distillation, and hydrogenated in a second reactor by contacting the oxidized H-donor and a hydrogenation catalyst in the presence of molecular hydrogen. The second process step regenerates the H-donor, which is recycled into the hydrotreatment of the phenolic feed.

BRIEF DESCRIPTION OF THE DRAWING

FIG. 1. Inventive process for the selective hydrodeoxygenation of phenols into aromatics comprises two parts (I) one-pot hydrogenation-dehydrogenation in absence of external supply of molecular hydrogen and (II) recycling of the H-donor in a second reactor. In the part (I), the process in absence of external supply of molecular hydrogen comprises (a) H-transfer hydrogenation of phenols to cyclic alcohols, (b) dehydration of cyclic alcohols to cyclic alkenes, and (c) H-transfer dehydrogenation of the cyclic alkenes producing aromatics.

The process is useful for hydrotreatment of phenolic feeds derived from plant biomass (e.g., lignin and bio-oils). The process is also useful for the hydrotreatment of phenolics into aromatics and/or saturates, which can be used as chemicals, synthetic biofuels or aviation fuel additives.

The inventive process, starting from phenols in absence of molecular hydrogen, enables the production of aromatics in high yields (Scheme 1). This contrasts with conventional processes performed under pressures of molecular hydrogen leading to alkanes and other saturates (e.g., cyclic alcohols). The processing of phenolic feeds such as lignin and bio-oils is carried out in absence of external supply of molecular hydrogen under very low-severity conditions. This means that the process is safer than the currently described ones.

In addition, the inventive processing of phenolic feeds does not require high pressure and high temperature reaction vessels, which means that the process is more economic than the current state-of-art. Furthermore, the process is performed under low severity conditions, so that the process is environmentally friendly, and even more important, the inventive process circumvents a typical problem of current technologies, that lead to full saturation of the intermediates into saturated hydrocarbons. As a result, the current process utilizes much less hydrogen, which is an expensive commodity. While the conventional processes utilize eight H atoms for the conversion of phenol into cyclohexane, the current process uses only two H atoms for the conversion of phenol into benzene instead.

Thus, the present invention refers to a process for converting phenolic feeds into aromatic hydrocarbons which comprises subjecting the phenolic feeds to a one-pot hydrotreatment in absence of external supply of molecular hydrogen, where the hydrotreatment comprises a step of contacting the phenolic feeds as H-acceptors with a metal catalyst and a solid acid catalyst in the presence of an H-donor in first reactor and recovering the obtained products from the reaction mixture.

The inventive process is a one-pot process comprising (a) the saturation of the phenols into cyclic alcohols, followed by (b) the dehydration of the cyclic alcohols into cyclic alkenes, which are (c) dehydrogenated producing aromatics (Scheme 1, part I). The steps (a) and (c) are hydrogen transfer reactions catalyzed by transition metal catalysts, while the step (b) is a dehydration reaction catalyzed by solid acids.

In a particular embodiment, the step of contacting the phenolic feeds with a metal catalyst and a solid acid catalyst in the presence of an H-donor (e.g., secondary alcohols and/or cyclic alkenes) is carried out at an autogenous pressure of 5-150 bar, in particular 5-100 bar, more particularly 5 to 60 bar. The reaction temperature is from 50° to 300° C., preferably at a temperature of 120° to 240° C. The reaction time is from 0.01 s to 8 h, preferably for 0.25 to 4 h. This process is performed in absence of molecular hydrogen externally supplied into the reactor.

It is a particular advantage of the inventive process, if it is additionally comprising the steps of separating the oxidized H-donor produced in the hydrotreatment step from the reaction mixture and transferring it to a second reactor, contacting said oxidized H-donor with molecular hydrogen in the presence of a hydrogenation catalyst in said second reactor and transferring said regenerated H-donor to the first reactor. In said embodiment, the H-donor can be nearly completely recycled.

Generally, the phenolic feeds are selected from lignin, phenolics derived from lignocellulosic materials selected from wood, switchgrass, sugarcane bagasse and mixtures thereof, and bio-oils obtained by the pyrolysis of lignocellulosic materials.

As a skeletal transition metal catalyst, any catalyst metal can be used as much as it is suitable for building up the catalyst skeleton. The metal catalyst can be suitably a skeletal transition metal catalyst or supported transition metal catalyst or mixture, preferably skeletal nickel, iron, cobalt or copper catalysts or a mixture thereof. Generally, the metal can be selected from nickel, iron, cobalt, copper, ruthenium, palladium, rhodium, osmium iridium, rhenium or mixtures thereof, preferably nickel, iron, cobalt, ruthenium, copper or any mixture thereof.

The solid acid catalyst is generally selected from zeolites, silica-aluminas, aluminium oxides, sulfated zirconia, mineral acid supported on oxides, preferably zeolites.

As an option, the catalyst can be a bifunctional solid comprising metal functionality and acid sites wherein said acid sites being preferably functional sites having acidic Brønsted or Lewis functionality or both.

The H-donor is generally selected from secondary alcohols having 3 to 8 carbon atoms, preferably 2-propanol, 2-butanol, 2-cyclohexanol or mixtures thereof. Cyclic alkenes, comprising 6 to 10 carbon atoms, preferably cyclohexene, tetraline or mixtures thereof can be used as H-donor.

In addition, formic acid can be also used as H-donor. Furthermore, polyols comprising 2 to 9 carbon atoms can be used as H-donor, preferably ethylene glycol, propylene glycols, erythritol, xylitol, sorbitol, mannitol and cyclohexanediols or mixtures thereof. Saccharides selected from glucose, fructose, mannose, xylose, cellobiose and sucrose can be also used as H-donor.

The inventive process can be carried out solvent-free or in a solvent selected from hydrocarbons, preferably saturated hydrocarbons or mixture thereof comprising 2 to 20 carbon atoms, particularly those comprising 4 to 16 carbons, supercritical carbon dioxide, water, aliphatic ethers, preferably aliphatic ethers or mixtures thereof comprising 1 to 8 carbon atoms, particularly those comprising 1 to 4 carbon atoms, cyclic ethers, particularly those comprising 4 to 6 carbon atoms, esters, particularly those comprising 4 to 6 carbon atoms and fluorinated solvents particularly those comprising 2 to 6 carbon atoms and 2 to 14 fluorine atoms.

The selectivity for aromatic can be controlled by adjusting the molar ratio of H-donor or mixture thereof to the phenolic content (expressed as mol equivalent of phenolic rings in the mixture). Generally, molar ratios of H-donor to phenolic content of 0.1 to 20, in particular 0.5 to 10, preferably 0.7 to 3, are selected.

In particular, the hydrotreatment, in the absence of external supply of molecular hydrogen, can be carried out in one or more steps under respective reaction conditions differing in temperature and/or pressure. The feed can be processed in single step at temperatures of 60 to 300° C., in particular 100 to 280° C., preferably 120 to 240° C. under the respective autogenous pressures. In addition, the feed can be processed in two steps in which the first step is performed at temperatures of 100 to 180° C., preferably 120 to 160° C., and the second step, at temperatures of 170 to 300° C., preferably 170 to 240° C.

The hydrotreatment can be carried out in batch or continuous reactors or combination of both.

The thus obtained reaction mixture can be used in refinery schemes, as source of aromatic hydrocarbons, or for preparing chemicals, synthetic biofuels or aviation fuel additives.

The present invention is explained in more detail by way of the following examples.

EXAMPLES

The following examples are intended to illustrate the present invention without limiting the invention in any way.

Example 1

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), H-BEA-35 zeolite (0.05 g), 2-propanol (0.19 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 99%. The yield of aromatics was 83.6%, the yield of saturates 9.8%. The individual yields were: benzene, 81.9%; toluene, 0.5%; propylbenzene 1.8%; cyclohexane, 8.9%;

propylcyclohexane 1.3%, methylphenols 0.9%, dimethoxyphenols 0.4%, propyl phenyl ether 0.4%.

Example 2

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), H-MOR zeolite, 0.044 g), 2-propanol (0.19 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to initial substrate concentration. The conversion was 99%. The yield of aromatics was 78.4%, the yield of saturates was 8.9%. The individual yields were: benzene, 74.3%; toluene, 2.0%; propylbenzene, 2.2%; cyclohexane, 8.2%; propylcyclohexane, 0.7%; cyclohexanol, 1.2%; others, 2.7%.

Example 3

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), H-ZSM-5 zeolite, 0.039 g), 2-propanol (0.19 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 93%. The yield of aromatics was 46.0%, the yield of saturates was 3.8%, the yield of cyclic alcohols and ketones was 26%; the yield of phenolics was 5.6%. The individual yields were: benzene, 45.4%; propylbenzene, 0.4%; cyclohexane, 3.8%; cyclohexanol, 11.8%; cyclohexanone, 13.3%; methylphenols, 5.6%; others, 2.3%.

Example 4

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), $SiO_2/Al_2O_3$, 0.042 g), 2-propanol (0.19 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to initial substrate concentration. The conversion was 90%. The yield of aromatics achieved 26.0%, the yield of saturates was 0.9%, the yield of cyclic alcohols and ketones was 49.5%; the yield of phenolics was 6.4%. The individual yields were: benzene, 25.2%; toluene, 0.3%; propylbenzene, 0.9%; cyclohexane, 0.9%; cyclohexanol, 20.2%; cyclohexanone, 22.7%; propylcyclohexanones, 1.9%; acetonyl cyclohexane, 4.6%; methylphenol, 6.4%.

Example 5

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), $\gamma$-$Al_2O_3$, 0.065 g), 2-propanol (0.19 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 87%. The yield of aromatics was 15.5%, the yield of cyclic alcohols and ketones was 56.7%, and the yield of phenolics was 6.2%. The individual yields were: benzene, 15.5%; cyclohexanol, 26.3%; cyclohexanone, 29.9%; acetonyl cyclohexane, 0.7%; methylphenol, 6.2%.

Example 6

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.17 g), H-BEA-35 zeolite (0.08 g), 2-propanol (0.18 g), n-hexadecane (7 mL) and a magnet bar were placed in a glass vial (20 mL). The vial was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 99%. The yield of aromatics was 92.4%, the yield of saturates was 4.9%. The individual yields were: benzene, 89.0%; toluene 0.6%; propylbenzene 1.8%; cyclohexane, 4.4%; propylcyclohexane, 0.5%.

Example 7

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.17 g), H-BEA-35 zeolite (0.15 g), 2-propanol (0.06 g), n-hexadecane (7 mL) and a magnet bar were placed in a glass vial (20 mL). The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 53%. The yield of aromatics was 41.4%, the yield of saturates was 1.3%, the yield of phenolics was 2.5%. The individual yields were: benzene, 40.8%; toluene 0.1%; propylbenzene: 0.7%; dipropylbenzenes: 0.2%; cyclohexane, 1.1%; propylcyclohexanes, 0.2%; phenol: 2.2%; methylphenols, 0.4%; propylphenols, 0.2%; butylphenols, 1.1%.

Example 8

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.17 g), H-BEA-35 zeolite (0.15 g), 2-propanol (0.12 g), n-hexadecane (7 mL) and a magnet bar were placed in a glass vial (20 mL). The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 81%. The yield of aromatics was 68.5%, the yield of saturates was 3.7%, the yield of phenolics was 1.4%. The individual yields were: benzene, 66.9%; toluene 0.3%; propylbenzene: 1.3%; cyclohexane, 3.1%; propylcyclohexane, 0.6%; phenol: 0.6%; methylphenol, 0.4%; butylphenols, 0.4%.

Example 9

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.17 g), H-BEA-35 zeolite (0.15 g), 2-propanol (0.18 g), n-hexadecane (7 mL) and a magnet bar were placed in a glass vial (20 mL). The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 97%. The yield of aromatics was 84.6%, the yield of saturates was 5.1%, the yield of phenolics was 0.8%. The individual yields were: benzene, 82.2%; toluene 0.4%; propylbenzene: 2.0%; cyclohexane, 3.9%; propylcyclohexane, 1.1%; phenol: 0.3%; methylphenol, 0.2%; butylphenols, 0.3%.

Example 10

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.17 g), H-BEA-35 zeolite (0.15 g), 2-propanol (0.30 g), n-hexadecane (7 mL) and a magnet bar were placed in a glass vial (20 mL). The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 100%. The yield of aromatics was 81.4%, the yield of saturates was 10.7%. The individual yields were: benzene, 78.7%; toluene 0.3%; propylbenzene: 2.3%; cyclohexane, 9.2%; propylcyclohexane, 1.6%.

Example 11

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, diphenyl ether, (0.2 g), H-BEA-35 zeolite (0.05 g), 2-propanol (0.21 g), n-hexadecane (7 mL) and a magnet bar were placed in a glass vial (20 mL). The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 90%. The yield of aromatics was 80.4%, the yield of saturates was 3.8%, the yield of phenolics was 0.9%. The individual yields were: benzene, 78.1%; toluene 0.5%; propylbenzene: 1.5%; dipropylbenzenes: 0.3%; cyclohexane, 3.5%; propylcyclohexane, 0.2%; phenol, 0.9%.

Example 12

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, 4-allyl-2,6-dimethoxyphenol (0.2 g), H-BEA-35 zeolite (0.05 g), 2-propanol (0.36 g), n-hexadecane (7 mL) and a magnet bar were placed in a glass vial (20 mL). The vial was flushed with Argon and then tightly closed. The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 100%. The yield of aromatics was 11.3%, the yield of saturates was 9.1%, the yield of cyclic alcohols and ketones was 2.4%; the yield of phenolics was 7.5%, the yield of methoxyphenolics was 53.6%. The individual yields were: benzene, 1.1%; toluene 0.4%; ethylbenzene, 0.3%; propylbenzene: 9.6%; cyclohexane, 1.4%; ethylcyclohexane, 0.7%; propylcyclohexane, 6.9%; propylcyclohexanols, 2.4%; propylphenols, 6.8%; butylphenols, 0.8%; 2-methoxy-4-propylphenol, 5.7%; 2,6-dimethoxy-4-propylphenol, 46.2%; 1,2,4-trimethoxybenzene, 1.1%.

Example 13

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The vial was flushed with Argon and then tightly closed. The experiment was performed under magnetic stirring at 140° C. for 4 h. The products were analyzed by GC-FID and GC-MS.

The yield of aromatics and saturates was calculated relative to the initial substrate concentration. The conversion was 100%. The yield of aromatics was 10.7%, the yield of saturates was 13.3%, the yield of cyclic alcohols and ketones was 61.7%. The individual yields were: benzene, 0.1%; toluene 0.1%; ethylbenzene, 0.2%; propylbenzene: 9.8%; butylbenzene, 0.5%; cyclohexane, 0.3%; ethylcyclohexane, 0.3%; propylcyclohexane, 12.1%; butylcyclohexane, 0.5%; cyclohexanol, 1.1%; propylcyclohexanols, 51.4%; propylcyclohexanones, 8.4%; butylphenols, 0.2%.

Example 14

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The vial was flushed with Argon and then tightly closed. The experiment was performed under magnetic stirring at 200° C. for 4 h. The products were analyzed by GC-FID and GC-MS.

The yield of aromatics and saturates was calculated relative to the initial substrate concentration. The conversion was 100%. The yield of aromatics was 53.7%, the yield of saturates was 27.0%, the yield of phenolics was 7.0%. The individual yields were: benzene, 2.0%; toluene 1.3%; ethylbenzene, 1.3%; propylbenzene: 43.5%; butylbenzene, 2.7%; pentylbenzene, 0.5%; dipropylbenzenes, 2.5%; cyclohexane, 1.9%; ethylcyclohexane, 1.6%; propylcyclohexane, 22.2%; butylcyclohexane, 0.8%; pentylcyclohexane, 0.3%;

dipropylcyclohexanes, 0.3%; propylphenols, 0.9%; butylphenols, 2.8%; butylphenyl methyl ethers, 3.3%; others, 3.9%.

Example 15

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-Allyl-2,6-dimethoxyphenol (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The experiment was performed under magnetic stirring at 240° C. for 4 h. The products were analyzed by GC-FID and GC-MS.

The yield of aromatics and saturates was calculated relative to the initial substrate concentration. The conversion was 100%. The yield of aromatics was 50.3%, the yield of saturates was 14.1%, the yield of phenolics was 19.0%. The individual yields were: benzene, 2.6%; toluene 2.3%; ethylbenzene, 3.5%; propylbenzene: 11.5%; butylbenzene, 5.1%; pentylbenzene, 0.6%; dipropylbenzenes, 3.0%; cyclohexane, 1.3%; ethylcyclohexane, 1.0%; propylcyclohexane, 11.4%; dipropylcyclohexanes, 0.3%; methylphenol, 1.6%; methylphenols, 3.9%; propylphenols, 3.5%; butylphenols, 4.8%; butylphenyl methyl ethers, 2.0%; dipropylphenols, 3.3%; others, 2.2%.

Example 16

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.05 g), cyclohexanol (0.31 g), n-heptane (7 mL) and a magnet bar were placed in a glass vial (20 mL). The vial was flushed with Argon and then tightly closed. The experiment was performed under magnetic stirring at 200° C. for 4 h. The products were analyzed by GC-FID and GC-MS.

The yield of aromatics and saturates was calculated relative to the initial substrate concentration. The conversion was 100%. The yield of aromatics was 47.1%, the yield of saturates was 6.6%, the yields of phenolics was 10.5%. The individual yields were: toluene 6.2%; ethylbenzene, 2.8%; propylbenzene: 34.5%; butylbenzene, 2.8%; pentylbenzene, 0.5%; dipropylbenzenes, 0.4%; ethylcyclohexane, 1.1%; propylcyclohexane, 5.3%; butylcyclohexane, 0.3%; methylphenols, 2.6%; ethylphenols, 2.7%; propylphenols, 2.3%; butylphenols, 2.8%; butylphenyl methyl ethers, 0.9%; others, 3.8%.

Example 17

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol, (0.2 g), H-BEA-35 zeolite (0.03 g), cyclohexanol (0.31 g), n-heptane (7 mL) and a magnet bar were placed in a glass vial (20 mL). The vial was flushed with Argon and then tightly closed. The experiment was performed under magnetic stirring at 200° C. for 4 h. The products were analyzed by GC-FID and GC-MS.

The yield of aromatics and saturates was calculated relative to the initial substrate concentration. The conversion was 100%. The yield of aromatics was 64.7%, the yield of saturates was 6.7%. The individual yields were: toluene 10.7%; ethylbenzene, 4.1%; propylbenzene: 45.4%; butylbenzene, 3.3%; pentylbenzene, 0.7%; dipropylbenzenes, 0.6%; ethylcyclohexane, 1.0%; propylcyclohexane, 5.7%; others, 1.6%.

Example 18

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.01 g), cyclohexanol (0.31 g), n-heptane (7 mL) and a magnet bar were placed in a glass vial (20 mL). The vial was flushed with Argon and then tightly closed. The experiment was performed under magnetic stirring at 200° C. for 4 h. The products were analyzed by GC-FID and GC-MS.

The yield of aromatics and saturates was calculated relative to the initial substrate concentration. The conversion was 100%. The yield of aromatics was 41.1%, the yield of saturates was 2.6%, the yield of cyclic alcohols and ketones was 9.9%, the yield of phenolics was 25.7%. The individual yields were: toluene 5.1%; ethylbenzene, 2.3%; propylbenzene: 30.9%; butylbenzene, 1.5%; pentylbenzene, 1.3%; ethylcyclohexane, 1.5%; propylcyclohexane, 1.1%; methylcyclopentanones, 0.9%; methylcyclohexanones, 3.2%; propylcyclyclohexanones, 4.7%; propylcyclohexanones, 1.1%; phenol, 3.4%; methylphenols, 6.2%; ethylphenols, 1.0%; propylphenols, 8.8%; butylphenols, 5.6%; butylphenyl methyl ethers, 0.6%; others, 5.5%.

Example 19

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.03 g), cyclohexanol (0.31 g), n-heptane (7 mL) and a magnet bar were placed in a glass vial (20 mL). The vial was flushed with Argon and then tightly closed. The experiment was performed under magnetic stirring at 240° C. for 4 h. The products were analyzed by GC-FID and GC-MS.

The yield of aromatics and saturates was calculated relative to the initial substrate concentration. The conversion was 100%. The yield of aromatics was 53.0%, the yield of saturates was 3.2%. The individual yields were: toluene 18.1%; ethylbenzene, 5.3%; propylbenzene: 18.1%; butylbenzene, 5.5%; pentylbenzene, 0.4%; dipropylbenzenes, 1.2%; propylbutylbenzenes, 2.2%; naphthalene, 1.0%; methylnaphthalene, 1.3%; ethylcyclohexane, 0.9%; propylcyclohexane, 2.3%; others, 2.6%.

Example 20

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.01 g), cyclohexanol (0.31 g), n-heptane (7 mL) and a magnet bar were placed in a glass vial (20 mL). The vial was flushed with Argon and then tightly closed. The experiment was performed under magnetic stirring at 240° C. for 4 h. The products were analyzed by GC-FID and GC-MS.

The yield of aromatics and saturates was calculated relative to the initial substrate concentration. The conversion was 100%. The yield of aromatics was 55.4%, the yield of saturates was 1.7%, the yield of phenolics is 9.5%. The individual yields were: toluene 18.2%; ethylbenzene, 5.0%; propylbenzene: 21.2%; butylbenzene, 3.8%; pentylbenzene, 0.5%; dipropylbenzenes, 0.7%; naphthalene, 0.9%; methylnaphthalene, 0.4%; ethylcyclohexane, 0.6%; propylcyclohexane, 0.9%; butylcyclohexane, 0.2%, others, 7.3%.

Example 21

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol, (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The experiment was performed under magnetic stirring first at 160° C. for 2 h, then at 180° C. for another 2 h. The products were analyzed by GC-FID and GC-MS.

The yield of aromatics and saturates was calculated relative to the initial substrate concentration. The conversion was 100%. The yield of aromatics was 37.1%, the yield of saturates was 27.5%, the yield of cyclic alcohols and ketones was 21.4%, the yield of phenolics was 1.6%. The individual yields were: benzene, 0.4%; toluene 0.5%; ethylbenzene, 0.7%; propylbenzene: 33.6%; butylbenzene, 2.0%; cyclohexane, 0.7%; ethylcyclohexane, 0.8%; propylcyclohexane, 25.1%; butylcyclohexane, 0.9%; propylcyclohexanols, 17.1%; propylcyclohexanones, 4.2%; butylphenols, 1.2%; butylphenyl methyl ethers, 0.4%; others, 3.6%.

Example 22

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol, (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The experiment was performed under magnetic stirring first at 160° C. for 2 h, then at 200° C. for another 2 h. The products were analyzed by GC-FID and GC-MS.

The yield of aromatics and saturates was calculated relative to the initial substrate concentration. The conversion was 100%. The yield of aromatics was 51.6%, the yield of saturates was 26.2%, the yield of cyclic alcohols and ketones was 3.2%, the yield of phenolics was 5.7%. The individual yields were: benzene, 0.7%; toluene 1.0%; ethylbenzene, 1.1%; propylbenzene: 45.6%; butylbenzene, 2.8%; cyclohexane, 0.8%; ethylcyclohexane, 1.1%; propylcyclohexane, 23.8%; butyl cyclohexane, 0.5%; propylcyclohexanols, 3.2%; butylphenols, 3.3%; butylphenyl methyl ethers, 2.4%; others, 4.3%.

Example 23

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol, (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The experiment was performed under magnetic stirring first at 160° C. for 2 h, then at 220° C. for another 2 h. The products were analyzed by GC-FID and GC-MS.

The yield of aromatics and saturates was calculated relative to the initial substrate concentration. The conversion was 100%. The yield of aromatics was 58.3%, the yield of saturates was 29.9%, the yield of phenolics was 1.7%. The individual yields were: benzene, 0.7%; toluene 1.7%; ethylbenzene, 2.0%; propylbenzene: 47.4%; butylbenzene, 3.9%; pentylbenzene, 0.6%; dipropylbenzenes, 1.9%; cyclohexane, 0.6%; ethylcyclohexane, 1.2%; propylcyclohexane, 27.4%; butylcyclohexane, 0.6%; butylphenols, 0.8%; butylphenyl methyl ethers, 0.9%; others, 2.6%.

Example 24

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.05 g), 2-propanol (0.90 g), n-heptane (7 mL) and a magnet bar were placed in a glass vial (20 mL). The vial was flushed with Argon and then tightly closed. The experiment was performed under magnetic stirring first at 160° C. for 2 h, then at 220° C. for another 2 h. The products were analyzed by GC-FID and GC-MS.

The yield of aromatics and saturates was calculated relative to the initial substrate concentration. The conversion was 100%. The yield of aromatics was 61.4%, the yield of saturates was 26.5%, the yield of phenolics was 1.4%. The individual yields were: benzene, 0.9%; toluene 3.0%; ethylbenzene, 2.7%; propylbenzene: 45.3%; butylbenzene, 5.7%; pentylbenzene, 1.3%; dipropylbenzenes, 2.5%; cyclohexane, 0.6%; ethylcyclohexane, 1.7%; propylcyclohexane, 23.7%; butylcyclohexane, 0.5%; butylphenols, 0.6%; butylphenyl methyl ethers, 0.8%; others, 2.1%.

Example 25

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.15 g), 2-propanol (0.84 g), n-heptane (7 mL) and a magnet bar were placed in an autoclave (20 mL). The autoclave was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 100%. The yield of aromatics was 36.5%, the yield of saturates was 40.4%, the yield of phenolics was 6.6% the yield of methoxyphenolics was 4.6%. The individual yields were: benzene, 0.4%; ethylbenzene, 0.6%; propylbenzene: 35.5%; cyclohexane, 1.4%; ethylcyclohexane, 1.7%; propylcyclohexane, 37.3%; propylphenols, 6.6%; others, 3.6%.

Example 26

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.15 g), 2-propanol (0.96 g), n-heptane (7 mL) and a magnet bar were placed in an autoclave (20 mL). The autoclave was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 100%. The yield of aromatics was 32.2%, the yield of saturates was 45.7%, the yield of cyclic alcohols and ketones was 13.2%. The individual yields were: benzene, 0.2%;

ethyl benzene, 0.5%; propyl benzene: 31.5%; cyclohexane, 1.3%; ethylcyclohexane, 1.5%; propylcyclohexane, 42.9%; propylcyclohexanol, 12.5%; propylcyclohexanones, 0.8%; others, 2.8%.

Example 27

Skeletal Ni catalyst (Raney Ni 2800, Aldrich, wet, 1.0 g) was washed first with acetone (3 times, 5 mL), then with the n-heptane (3 times, 5 mL). The washed Ni catalyst, 4-allyl-2,6-dimethoxyphenol (0.2 g), H-BEA-35 zeolite (0.15 g), 2-propanol (1.20 g), n-heptane (7 mL) and a magnet bar were placed in an autoclave (20 mL). The autoclave was flushed with Argon and then tightly closed. The experiment was performed under magnetic stirring at 160° C. for 4 h. The products were analyzed by GC-FID and GC-MS.

The yield of aromatics and saturates was calculated relative to the initial substrate concentration. The conversion was 100%. The yield of aromatics was 11.9%, the yield of saturates was 33.0%, the yield of cyclic alcohols and ketones was 45.8%. The individual yields were: ethyl benzene, 0.2%; propylbenzene: 11.7%; cyclohexane, 0.9%; ethylcyclohexane, 0.9%; propylcyclohexane, 31.2%; cyclohexanol, 0.9%; ethylcyclohexanols, 0.5%; propylcyclohexanols, 41.7%; propylcyclohexanones, 2.7%; others, 2.5%.

Example 28

Skeletal Ni catalyst (Raney Ni 2800, Aldrich, wet, 1.0 g) was washed first with acetone (3 times, 5 mL), then with n-heptane (5 mL) 3 times. The washed Ni catalyst, bio-oil fraction (0.1 g), H-BEA-35 zeolite (0.05 g), 2-propanol (0.50 g), n-heptane (7 mL) and a magnet bar were placed in an autoclave (20 mL). The reactor was flushed with Argon and then tightly closed. The experiment was performed under magnetic stirring first at 160° C. for 2 h, then at 220° C. for another 2 h.

The products were analyzed by GC×GC-FID and -MS. The product distribution achieved was 71% aromatics, 26% alkanes and 3% phenolics.

Example 29

Skeletal Ni catalyst (Raney Ni 2800, Aldrich, wet, 1.0 g) was washed first with acetone (3 times, 5 mL), then with n-heptane (5 mL) 3 times. The washed Ni catalyst, bio-oil fraction (0.1 g), H-BEA-35 zeolite (0.05 g), cyclohexanol (0.16 g), n-heptane (7 mL) and a magnet bar were placed in an autoclave (20 mL). The reactor was flushed with Argon and then tightly closed. The experiment was performed under magnetic stirring at 220° C. for 4 h. The products were analyzed by GC×GC-FID and -MS. The product distribution achieved was 90% aromatics and 10% alkanes.

Example 30

Skeletal Ni catalyst (Raney Ni 2800, Aldrich, wet, 1.0 g) was washed first with acetone (3 times, 5 mL), then with the n-hexadecane (3 times, 5 mL). The washed Ni catalyst, phenol (0.19 g), H-BET-35 zeolite, 0.05 g), 2-propanol (0.18 g), n-hexadecane (7 mL) and a magnet bar were placed in a glass vial (20 mL). The vial was flushed with Argon and then tightly closed. The experiment was performed at 160° C. under magnetic stirring in a heating block for 4 h. The products were analyzed by GC-FID and GC-MS.

The yield of aromatics and saturates was calculated relative to the initial concentration of the phenol plus cyclohexene. The conversion for phenol was 94%. The yield of aromatics was 71.1%, the yield of saturates was 15.1%. The individual yields were: benzene, 70.8%; toluene, 0.1%; propylbenzene, 0.3%; propylcyclohexane, 15.1%; methylphenols 0.7%; others, 0.9%.

Example 30

Skeletal Ni catalyst (Raney Ni 2800, Aldrich, wet, 1.0 g) was washed first with acetone (3 times, 5 mL), then with n-pentane (5 mL) 3 times. The washed Ni catalyst, organosolv lignin (Poplar wood, 0.1 g), H-BEA-35 zeolite (0.05 g), 2-propanol (0.50 g), n-pentane (7 mL) and a magnet bar were placed in an autoclave (20 mL). The reactor was flushed with Argon and then tightly closed. The experiment was performed under magnetic stirring first at 160° C. for 2 h, then at 240° C. for another 2 h. The products were analyzed by GC×GC-FID and -MS. The product mixture comprises 78% aromatics, 18% alkanes and 4% phenols.

The invention claimed is:

1. A process for the selective hydrodeoxygenation of phenolic feeds into aromatic hydrocarbons by subjecting the phenolic feeds to a one-pot hydrotreatment in absence of external supply of molecular hydrogen, where the hydrotreatment comprises a step of contacting the phenolic feeds with a transition metal catalyst and a solid acid catalyst in the presence of a hydrogen donor (H-donor) at an autogenous pressure of 5 to 150 bar and at a temperature of 60° C. to 280° C. in a first reactor to produce a reaction mixture comprising reaction products and recovering the reaction products from the reaction mixture, wherein the H-donor is selected from secondary alcohols having 3 to 8 carbon atoms, cyclic alkenes having 3 to 10 carbon atoms, polyols comprising 2 to 9 carbon atoms, saccharides, formic acid or mixtures thereof, wherein the phenolic feeds are selected from lignin, phenolics derived from lignocellulosic materials selected from wood, switchgrass, sugarcane bagasse, crop residues and mixtures thereof, and bio-oils obtained by the pyrolysis of lignocellulosic materials.

2. The process as claimed in claim 1, wherein the step of contacting the phenolic feeds with the transition metal catalyst and the solid acid catalyst in the presence of an H-donor is carried out at an autogenous pressure of 5 to 100 bar and at a temperature of 80° C. to 240° C. for a reaction time of 0.01 s to 8 h.

3. The process as claimed in claim 1, wherein the reaction products comprise an oxidized H-donor, and the process additionally comprises the steps of separating the oxidized H-donor from the reaction mixture and transferring the oxidized H-donor into a second reactor, contacting said oxidized H-donor with molecular hydrogen in the presence of a hydrogenation catalyst in said second reactor to yield a regenerated H-donor and transferring said regenerated H-donor into the first reactor, which operates in absence of external supply of molecular hydrogen.

4. The process as claimed in claim 1, wherein the phenolic feeds are derived from the liquefaction of phenolic resins.

5. The process as claimed in claim 1, wherein the phenolic feeds are derived from the Kraft lignin and lignosulfonates.

6. The process as claimed in claim 1, wherein the transition metal catalyst can be a skeletal transition metal catalyst or supported transition metal catalyst or mixture.

7. The process as claimed in claim 6, wherein the metal is selected from nickel, iron, cobalt, copper, ruthenium, palladium, rhodium, osmium iridium, rhenium or mixtures thereof.

8. The process as claimed in claim 1, wherein the solid acid catalyst is selected from zeolites, silica-aluminas, aluminium oxides, sulfated zirconia, and mineral acid supported on oxides.

9. The process as claimed in claim 1, wherein the catalyst is a bifunctional solid comprising metal functionality and acid sites, said acid sites being optionally functional sites having acidic Brønsted or Lewis functionality or both.

10. The process as claimed in claim 1, wherein the H-donor is selected from secondary alcohols having 3 to 8 carbon atoms, cyclic alkenes having 3 to 10 carbon atoms, polyols comprising 2 to 9 carbon atoms or mixtures thereof.

11. The process as claimed in claim 1, wherein the hydrotreatment is carried out solvent-free or in the presence of a solvent selected from hydrocarbons, supercritical carbon dioxide, water, aliphatic ethers, cyclic ethers, esters and fluorinated solvents.

12. The process as claimed in claim 1, wherein the ratio of the reaction products is controlled by adjusting the molar ratio of phenolic content to the H-donor or mixtures thereof, or by adjusting the ratio of metal catalyst to solid acid catalyst.

13. The process as claimed in claim 1, wherein the hydrotreatment is carried out in one or more intervals at respective reaction conditions differing in temperature and/or pressure.

14. A process for preparing chemicals, synthetic biofuels or aviation fuel additives, said process comprising:
(a) carrying out the process as claimed in claim 1 to obtain a product; and
(b) processing the product to chemicals, synthetic biofuels or aviation fuel additives.

15. The process as claimed in claim 1, wherein the temperature is 120° C. to 240° C.

16. A process for the selective hydrodeoxygenation of phenolic feeds into aromatic hydrocarbons by subjecting the phenolic feeds to a one-pot hydrotreatment in absence of external supply of molecular hydrogen, where the hydrotreatment comprises a step of contacting the phenolic feeds with a transition metal catalyst and a solid acid catalyst in the presence of a hydrogen donor (H-donor) at an autogenous pressure of 5 to 150 bar and at a temperature of 50° C. to 300° C. in a first reactor to yield oxidized H-donor, separating the oxidized H-donor from the reaction mixture and transferring the oxidized H-donor into a second reactor, contacting said oxidized H-donor with molecular hydrogen in the presence of a hydrogenation catalyst in said second reactor to yield a regenerated H-donor, and transferring said regenerated H-donor into the first reactor, which operates in absence of external supply of molecular hydrogen, wherein the H-donor is selected from secondary alcohols having 3 to 8 carbon atoms, cyclic alkenes having 3 to 10 carbon atoms, polyols comprising 2 to 9 carbon atoms, saccharides, formic acid or mixtures thereof, wherein the phenolic feeds are selected from lignin, phenolics derived from lignocellulosic materials selected from wood, switchgrass, sugarcane bagasse, crop residues and mixtures thereof, and bio-oils obtained by the pyrolysis of lignocellulosic materials.

17. A process for preparing chemicals, synthetic biofuels or aviation fuel additives, said process comprising:
(a) carrying out the process as claimed in claim 16 to obtain a product; and
(b) processing the product to chemicals, synthetic biofuels or aviation fuel additives.

* * * * *